US009416044B2

(12) United States Patent
Trommer et al.

(10) Patent No.: US 9,416,044 B2
(45) Date of Patent: Aug. 16, 2016

(54) HYDROGEN-SUPPORTED FLUORINATION OF SOOT BODIES

(71) Applicant: Heraeus Quarzglas GmbH & Co. KG, Hanau (DE)

(72) Inventors: Martin Trommer, Bitterfeld (DE); Malte Schwerin, Halle/Saale (DE); Stephan Grimm, Jena (DE); Frank Froehlich, Jena (DE); Johannes Kirchhof, Jena (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 0 days.

(21) Appl. No.: 14/431,525

(22) PCT Filed: Sep. 6, 2013

(86) PCT No.: PCT/EP2013/068438
§ 371 (c)(1),
(2) Date: Mar. 26, 2015

(87) PCT Pub. No.: WO2014/048694
PCT Pub. Date: Apr. 3, 2014

(65) Prior Publication Data
US 2015/0259238 A1    Sep. 17, 2015

(30) Foreign Application Priority Data

Sep. 27, 2012  (EP) .................................. 12006738

(51) Int. Cl.
*C03C 3/06*  (2006.01)
*C03B 37/018*  (2006.01)
(Continued)

(52) U.S. Cl.
CPC ........... *C03B 37/018* (2013.01); *C03B 19/1461* (2013.01); *C03B 23/047* (2013.01);
(Continued)

(58) Field of Classification Search
CPC ............ C03C 2201/02; C03C 2201/06; C03C 2201/12; C03C 2201/14
USPC .......................................................... 501/54
See application file for complete search history.

(56) References Cited

U.S. PATENT DOCUMENTS 4,199,335 A * 4/1980 Gliemeroth ....... C03B 37/01861
427/167
6,263,706 B1 * 7/2001 Deliso ............... C03B 37/01211
65/397
(Continued)

FOREIGN PATENT DOCUMENTS

DE            101 38 046 A1   3/2002
DE   10 2004 059 804 A1   7/2006
(Continued)

OTHER PUBLICATIONS

Int'l Search Report issued on Nov. 20, 2013 in Int'l Application No. PCT/EP2013/068438.
(Continued)

*Primary Examiner* — Noah Wiese
(74) *Attorney, Agent, or Firm* — Panitch Schwarze Belisario & Nadel LLP

(57) ABSTRACT

The invention relates to a method for fluorinating a soot body. The method involves:
a) providing a soot body, and
b) treating the soot body with a gas mixture containing hydrogen and $C_nF_{2n+2}$ (n=1 or 2) at a temperature in the range of $(1{,}280 - n*250)°$ C. to $(1{,}220 - n*100)°$ C.

26 Claims, 2 Drawing Sheets

(51) Int. Cl.
*C03B 37/014* (2006.01)
*C03B 19/14* (2006.01)
*C03B 23/047* (2006.01)
*C03B 37/027* (2006.01)
*C03C 3/04* (2006.01)

(52) U.S. Cl.
CPC ......... *C03B37/01446* (2013.01); *C03B 37/027* (2013.01); *C03C 3/04* (2013.01); *C03C 3/06* (2013.01); *C03B 2201/12* (2013.01); *C03C 2201/12* (2013.01); *C03C 2203/46* (2013.01); *C03C 2203/54* (2013.01)

(56) References Cited

U.S. PATENT DOCUMENTS

| | | | |
|---|---|---|---|
| 6,265,115 B1 | 7/2001 | Berkey et al. | |
| 6,807,823 B2 | 10/2004 | Ohga et al. | |
| 8,245,543 B2 | 8/2012 | Huenermann | |
| 2001/0018835 A1 | 9/2001 | Abe et al. | |
| 2003/0221459 A1 | 12/2003 | Walczak | |
| 2004/0200240 A1* | 10/2004 | Abe | C03B 37/01446 65/397 |
| 2005/0109065 A1* | 5/2005 | Ichii | C03B 37/01413 65/397 |
| 2007/0104437 A1 | 5/2007 | Bookbinder et al. | |
| 2008/0276650 A1* | 11/2008 | Bookbinder | C03B 37/0142 65/402 |
| 2010/0124396 A1* | 5/2010 | Coon | G02B 6/02333 385/125 |

FOREIGN PATENT DOCUMENTS

| | | |
|---|---|---|
| DE | 10 2007 024 725 A1 | 11/2008 |
| EP | 1 337 483 A1 | 8/2003 |
| JP | S60-180928 A | 9/1985 |
| JP | S62-176937 A | 8/1987 |
| JP | S63-225543 A | 9/1988 |
| JP | H01-212243 A | 8/1989 |
| JP | H01-219034 A | 9/1989 |

OTHER PUBLICATIONS

EP Search Report issued on Apr. 4, 2013 in EP Application No. 12006738.4.
International Preliminary Report on Patentability issued Mar. 31, 2015 in International Application No. PCT/EP2013/068438.

* cited by examiner

HYDROGEN-SUPPORTED FLUORINATION OF SOOT BODIES

CROSS-REFERENCE TO RELATED APPLICATIONS

This application is a Section 371 of International Application No. PCT/EP2013/068438, filed Sep. 6, 2013, which was published in the German language on Apr. 3, 2014 under International Publication No. WO 2014/048694 A1, and the disclosure of which is incorporated herein by reference.

BACKGROUND OF THE INVENTION

The invention relates to a method for fluorination of a soot body, fluorinated soot bodies obtained by the method, a method for producing a synthetic glass for an optical element using this fluorination method, as well as glass obtained by this production method.

When producing synthetic quartz glass for commercial applications, it is customary to generate $SiO_2$ particles from a silicon-containing starting substance in a CVD (chemical vapor deposition) procedure by hydrolysis and/or oxidation, followed by precipitation on a support. The method can be subdivided into external and internal deposition methods. In external deposition methods, $SiO_2$ particles are applied onto the outside of a rotating support. Examples of depositing methods include the so-called OVD method (outside vapor phase deposition) and the PECVD method (plasma-enhanced chemical vapor deposition). The most prominent example of an internal deposition method is the MCVD method (modified chemical vapor deposition), in which $SiO_2$ particles are deposited on the internal wall of a tube that is heated from outside. If the temperature at the support surface is sufficiently high, the $SiO_2$ particles become vitrified directly ("direct vitrification").

In contrast, in the so-called "soot process," the temperature gets so low during the deposition of the $SiO_2$ particles that a porous soot layer is obtained, which is then sintered into a transparent glass in a separate process step. One pertinent example is the "OVD process" known from DE 10 2007 024 725 A1, in which combustion gases in the form of hydrogen and oxygen and a silicon-containing starting compound are fed to a depositing burner and are then converted into $SiO_2$ particles in a burner flame allocated to the depositing burner. These particles are then deposited layer-by-layer by back-and-forth motions of the depositing burner along a substrate that rotates along its longitudinal axis, resulting in the formation of an $SiO_2$ blank.

Synthetic quartz glass for use in microlithography or for optical components in telecommunications must meet strict requirements in terms of the homogeneity of its refractive index.

It is known from the prior art to use fluorine as a doping agent to lower the refractive index of quartz glass. Accordingly, US 2001/0018835 describes the production of UV-resistant, F-doped quartz glass, in which soot bodies are heated in an atmosphere consisting of hydrogen or oxygen and a sintering process takes place in a fluorine-containing atmosphere in a subsequent process step. This two-step treatment is to attain an improvement of the UV transmission.

JP 63-225543 A describes fluorine doping and vitrification of a porous silicon oxide-containing preform aiming to prevent structural defects.

EP 1 337 483 A1 describes a method for dehydrogenating a soot mold, in which a gas mixture of chlorine and carbon monoxide is applied to a soot body.

JP 62-176937 describes a method for producing fluorine-doped quartz glass in which a soot body is first treated with silane ($SiH_4$) in an oxygen-depleted atmosphere in a first step in order to generate oxygen defects, which are to lead to an improved formation of $SiF_4$ in a downstream fluorination step. This is to attain a higher degree of fluorination in the silicon oxide soot body.

In order to render the doping process as extensive and as uniform as possible, a doping gas that allows for reaction of the fluorine contained therein with the $SiO_2$ matrix in an acceptable temperature window and diffuses into the soot body as quickly as possible needs to be used for the $SiO_2$ soot bodies. However, it is a drawback that the soot body begins to sinter with increasing degree of doping during the doping process at the high temperatures used for doping. As a result, the pores close and the desired diffusion of the fluorination agent is made more difficult, which results in inhomogeneities due to the pre-sintering and in partially deformed soot bodies.

It has been found that tetrafluoromethane and hexafluoroethane can be used well for fluorination of $SiO_2$-containing soot bodies, since these fluorohydrocarbons, unlike the common fluorination agent $SiF_4$, show good handling properties and no toxicity, are inert at room temperature and are comparatively inexpensive. However, it is disadvantageous that the use of tetrafluoromethane or hexafluoroethane requires relatively high temperatures for thermal decomposition, and is associated with the formation of a reactive fluorine-containing entity. At these high temperatures, there is already substantial sintering of the soot body ongoing, which counteracts homogeneous fluorination. Moreover, it has been found that the use of the fluorohydrocarbons at the temperatures needed to attain high fluorine contents in the glass is associated with the generation of carbon, which can be deposited in the doping apparatus, but also in the soot body and might lead to blackening of the glass in an extreme scenario. The generation of soot during the fluorination with tetrafluoromethane or hexafluoroethane has a disadvantageous effect on the method and the quality of the soot bodies and/or quartz glass thus made.

BRIEF SUMMARY OF THE INVENTION

Surprisingly, it has been found that upon addition of hydrogen to the fluorohydrocarbons, tetrafluoromethane or hexafluoroethane, the formation of reactive fluorine-containing entities takes place at clearly lower temperatures. Accordingly, the diffusion into the soot body and, therefore, the fluorination of the soot body is improved and proceeds more homogeneously. The underlying reason may be the additional formation of HF, since this molecule is very small and can therefore diffuse significantly better into the pores of the soot body than the $SiF_4$, which is also formed in the process. Moreover, the formation of soot can be suppressed through appropriate selection of a temperature window.

A first subject matter of the present invention is a method for fluorination of a soot body, comprising the steps of
 a) providing a soot body, and
 b) treating the soot body with a gas mixture comprising $C_nF_{2n+2}$ wherein n=1 or 2 and hydrogen at a temperature in the range of $(1{,}280\text{-}n*250)° C.$ to $(1{,}220\text{-}n*100)° C.$

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
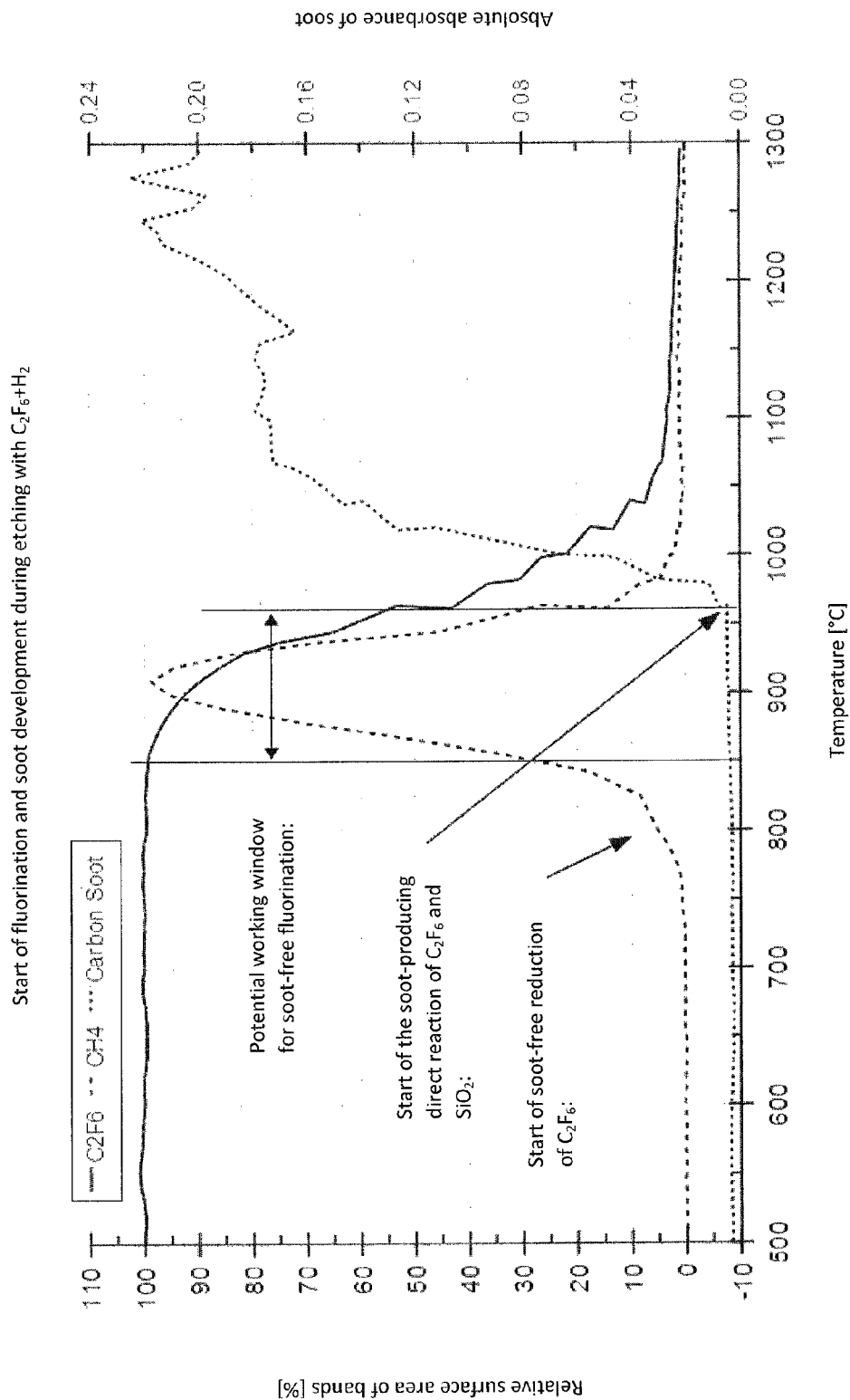
FIG. 1 is a graph of relative surface area of bands versus temperature for fluorination and soot development during etching with $C_2F_6$ and $H_2$.

A soot body is a body that is produced in a so-called "soot process." In a soot process, the temperature is selected to be sufficiently low during the deposition of the $SiO_2$ particles that a porous soot body is generated, which is then sintered to form quartz glass in a separate procedural step.

Generally, the structure of the $SiO_2$ soot body is sufficiently gas-permeable, which renders a uniform gas phase treatment or sintering easier. In the case of layers of higher density, this can only be done to a limited degree because the layers are diffusion barriers that can cause a non-uniform treatment result in drying or sintering processes. This issue is present because of the long diffusion pathways that exist, in particular, in $SiO_2$ soot bodies having a large volume.

In the scope of the present invention, the soot body is preferably a porous $SiO_2$ soot body, in particular a soot tube comprising deposited $SiO_2$ particles.

In this context, a soot body may be produced by hydrolysis and/or oxidation of silicon-containing starting substances into $SiO_2$ particles, which are then deposited onto a substrate.

In a preferred embodiment, the soot body has a mean density of 0.48 g/cm$^3$ to 0.77 g/cm$^3$ and preferably a specific surface area, measured as BET surface area, of more than 5 m$^2$/g to 25 m$^2$/g.

The density of soot bodies manufactured according to the prior art and/or according to the method according to the invention can be 22-35% of the density of quartz glass, based on a quartz glass density of 2.21 g/cm$^3$. The density obtained is a function, inter alia, of the distance of the burners from the deposition surface, the adjusted temperature, the stoichiometry of the gases, and the geometry of the burners. Varying these factors allows different density profiles to be established within the soot body, such as linear, increasing, or decreasing radial density profiles in soot bodies. To test the density distribution, the local density of a soot body is determined at approx. 700 measuring points using known methods. For this purpose, fifty images of sections are recorded with computed tomography procedures, which each show a section transverse to the longitudinal axis of the soot body. In order to determine the radial density profile, fourteen approximately equidistant measuring points are recorded in each of the fifty computed tomography sections. This procedure allows the radial density profile in each case to be determined along a section through the soot body and a density profile along the longitudinal axis of the soot body to be determined.

The mean density M is the mean of all fifty measuring points, which vary in their geometrical positioning along the longitudinal axis, but not in their geometrical distance from the central axis. In average soot bodies, the computed tomography procedures generate fifty cross-sections through the soot body such that the mean of the density is obtained by calculating the mean of fifty density measurements each. In general, the means of the density show a normal distribution in each case such that a width ρ can be determined. For determination of the radial density profile, fourteen measuring points each, whose radial distance from the center of the soot body increases, are taken in each of the fifty steps. The variance, delta, of the width p of the mean M thus reflects a statistical sample of fourteen points.

Preferably, the soot body is manufactured such that at least one, preferably at least two, depositing burner(s) is/are used to deposit $SiO_2$ particles for mass deposition on a substrate that rotates about its longitudinal axis.

In a further embodiment, the deposition procedure can involve a multitude of depositing burners. For this purpose, at least one first feed medium containing a silicon-containing raw medium, a second feed medium, which is a fuel medium, and preferably a third feed medium, which is a support gas, are supplied to the respective burners and $SiO_2$ particles are deposited on the outside of a rotating substrate. In the process, the silicon-containing raw medium is supplied to the reaction zones of the depositing burners, which essentially consist of the burner flames, and then converted through oxidation and/or hydrolysis and/or pyrolysis to form $SiO_2$ particles that become deposited on the substrate to form the soot body.

The fuel medium can preferably be selected from hydrogen, methane, propane, butane, natural gas, or mixtures thereof.

The silicon-containing raw medium preferably belongs to the group of siloxanes or silanes, in particular chlorosilanes. Specifically, $SiCl_4$ can be used as a chlorosilane and compounds from the group of polyalkylsiloxanes can be used as siloxanes.

In the scope of the invention, the term polyalkylsiloxane may be understood to include both linear and cyclical molecular structures. However, the silicon-containing raw medium preferably contains D4 (also called OMCTS) as its main ingredient. The D3, D4, D5 terminology originates from a terminology introduced by General Electric Inc., in which "D" represents the [(CH3)2Si]-0- group. Accordingly, D3 refers to hexamethylcyclotrisiloxane, D4 to octamethylcyclotetrasiloxane, D5 to decamethylcyclopentasiloxane, and D6 to dodecamethylcyclohexasiloxane. In a preferred variant, D4 is the main component of the silicon-containing raw medium. Accordingly, the fraction of D4 is at least 70% by weight, in particular at least 80% by weight, preferably at least 90% by weight, particularly preferably at least 94% by weight of the silicon-containing raw medium.

Preferably, an oxidation agent, for example oxygen, can be used as supporting gas.

Surprisingly, it has been found that the fluorination of $SiO_2$ soot bodies by tetrafluoromethane or hexafluoroethane proceeds largely free of soot if the fluorination proceeds in a defined temperature window and if the fluorination by the fluorohydrocarbons proceeds in the presence of hydrogen. According to the invention, the fluorination is carried out by treating the soot body with a gas mixture comprising $C_nF_{2n+2}$ wherein n=1 or 2 and hydrogen at a temperature in the range of (1,280-n*250)° C. to (1,220-n*100)° C.

Tetrafluoromethane is used in combination with hydrogen in this context at a somewhat higher temperature than the fluorination by hexafluoroethane in the presence of hydrogen.

In a preferred embodiment, the soot body is treated with a gas mixture comprising $CF_4$ and hydrogen in a temperature range of 1,050 to 1,120° C.

The treatment of the soot body with a gas mixture comprising $C_2F_6$ and hydrogen is advantageously carried out in a temperature range of 750 to 1,000° C. advantageously from 850 to 980° C.

The gas mixture used for fluorination of the soot body comprising $C_nF_{2n+2}$, wherein n=1 or 2, and hydrogen is preferably used in a form diluted with inert gases. Advantageously, the gas mixture comprises up to 65 vol. %, in particular 5 to 35 vol. %, $C_nF_{2n+2}$, wherein n=1 or 2, and hydrogen, each based on the total volume of the gas mixture at 25° C.

The quantity of fluorohydrocarbons $C_2F_6$ or $CF_4$ in the gas mixture is preferably 10 to 60 vol. %, in particular 12 to 35 vol. %, each based on the total volume of the gas mixture at 25° C.

It is preferable to keep the quantity of hydrogen in the gas mixture as low as possible in order to minimize the explosion hazard at the selected reaction conditions. Preferably, the gas mixture contains hydrogen in an amount of up to 15 vol. %, more preferably up to 5 vol. %, in particular between 1 and 4 vol. %, and specifically between 1 and 3 vol. %, each based on the total volume of the gas mixture at 25° C. However, as a matter of principle, higher hydrogen contents of up to the fraction that can be converted according to stoichiometry are feasible just as well, but necessitate a significant level of explosion protection.

Advantageously, the volume ratio of $C_nF_{2n+2}$, wherein n=1 or 2, and hydrogen in the gas mixture is 4:1 to 1:4, in particular 3:1 to 1:3, and specifically 2:1 to 1:1.

In addition, the gas mixture may comprise inert gases. Nitrogen or noble gases such as argon or helium are preferred as inert gases. The inert gases may account for up to 95 vol. % of the gas mixture. In a preferred embodiment of the method according to the invention, the gas mixture contains 35 to 95 vol. % nitrogen, in particular 70 to 90 vol. %, each based on the total volume of the gas mixture at 25° C.

In a further preferred embodiment, the gas mixture is essentially free of chlorine or chlorine-containing compounds. In the scope of the invention, to be "essentially free" means that the gas mixture comprises less than 10,000 ppm (parts per million, in terms of weight), preferably less than 1,000 ppm chlorine and/or chlorine-containing compounds.

The fluorination of the soot body may be carried out in reactors that are known to a person skilled in the art. The reactors are usually designed appropriately such that they are equipped with facilities for gas supply and gas discharge, as well as for pressure and temperature control. The fluorination according to the invention of the soot body preferably proceeds at a pressure inside the reactor that is lower than the pressure outside the reactor. The reduced pressure inside the reactor may prevent leakage of the reaction gases from the reactor. Preferably, the pressure difference between the external pressure (pressure outside the reactor) and the internal pressure (pressure inside the reactor, in which the fluorination of the soot body takes place) is at least 1 mbar, in particular at least 5 mbar, specifically at least 10 mbar, for example at least 50 mbar. The fluorination typically takes place at a pressure below atmospheric pressure, preferably in a range of 800 mbar to less than 1,000 mbar, for example in a range of 850 to 980 mbar.

Preferably, the soot body is fluorinated in a continuous process, in which the gas mixture that is provided, according to the invention, for treatment of the soot body is supplied continuously to the reactor during the fluorination of the soot body. Depending on the size of the reactor and the size of the soot body, the supply and discharge of the gas mixture for this purpose can be in a range of 0.5 to 50 l/min, preferably 5 to 20 l/min.

Depending on the size and weight of the soot body to be fluorinated, the fluorination may take place for several hours, if applicable. Typically, the duration of fluorination of the soot body is 1 to 24 hours, for example 3 to 16 hours.

In an advantageous embodiment of the fluorination method according to the invention, the soot body is dried before treatment step b). It has been found that the fluorination and the quality of the soot body thus obtained may be improved significantly if the soot body is dried first. Typically, the soot body is dried at temperatures in the range of 800 to 1,150° C. This attains hydroxyl group contents of 50 ppm to 500 ppm.

Moreover, in addition to thermal drying, there is the option of reducing the hydroxyl group content through treatment with a dehydrogenating gas, such as, for example, chlorine. This allows hydroxyl group contents of 0.1 ppm to 20 ppm to be attained. These contents may be measured by IT spectroscopy on transparent glass obtained by sintering after the corresponding drying step.

Since the fluorine can react with the hydroxyl groups that are present during the fluorination step, both their level and the spatial distribution have an influence on the fluorination. Drying plus chlorination provides a very low and homogeneous OH content in the soot body such that the ensuing fluorine distribution also takes place very homogeneously. While the fluorine level that can be attained is not as high as with exclusively thermal drying, only a lower homogeneity can be attained with the latter.

The soot bodies that can be obtained through the fluorination method according to the invention are fluorinated homogeneously. Moreover, the soot bodies thus obtained do not have defects arising from soot depositions.

Therefore, another subject matter of the present invention is a fluorinated soot body that can be or is obtained through the fluorination method according to the invention.

The fluorination method according to the invention is usually used in a method for producing synthetic glass for optical elements.

Therefore, another subject matter of the present invention is a method for producing a synthetic glass for an optical element, comprising the steps of i) producing or providing a soot body;
ii) fluorinating the soot body in accordance with the fluorination method according to the invention;
iii) if applicable, chlorinating the fluorinated soot body; and
iv) vitrifying the fluorinated soot body at a pressure of less than 0.1 bar, preferably less than $10^{-2}$ bar, and at a temperature above the fluorination temperature, preferably between 1,250° C. and 1,500° C.

Producing or providing the soot body as described in step i) of the production method according to the invention takes place in the same manner as in the fluorination method according to the invention described above.

The soot body can be produced according to different methods that are known to a person skilled in the art. Preferably, the soot body is manufactured such that at least one, preferably at least two, depositing burners are used to deposit $SiO_2$ particles for mass deposition on a substrate that rotates about its longitudinal axis.

The fluorination according to the invention described in step ii) of the production method according to the invention takes place as described above. The treatment of the soot body provided or produced in step i) takes place in the same manner as in step b) of the fluorination method according to the invention.

A step of chlorinating the fluorinated soot body can take place, in addition, in step iii) of the production method according to the invention. The chlorination serves for dehydrating the soot body, which leads to a further improvement of the quality of the soot body and/or of the synthetic glass to be produced from it. The chlorination preferably takes place with a gas mixture that contains chlorine. In a preferred embodiment, the gas mixture for chlorination contains 10 to 25 vol. % chlorine, based on the total volume of the gas mixture at 25° C. The gas mixture for chlorination typically comprises additional inert gases, preferably nitrogen or argon. In a further preferred embodiment, the gas mixture for chlorination comprises 75 to 90 vol. % nitrogen, based on the total volume of the chlorine gas mixture.

The chlorination preferably takes place in a temperature range of 750 to 1,100° C. The duration of chlorination is a function of the size and shape of the soot body and can vary accordingly. Typically, the chlorination takes place for a period of time of 1 to 24 hours, preferably 3 to 16 hours.

Depending on the size of the reactor and the size of the soot body, the supply and discharge of the gas mixture for this purpose can be in a range of 0.5 to 50 l/min, preferably 5 to 20 l/min.

The vitrifying of the fluorinated soot body in step iv) takes place at a pressure of less than 0.1 bar, preferably less than $10^{-2}$ bar, and at a temperature above the fluorination temperature, preferably between 1,250° C. and 1,500° C.

In the production method according to the invention, it is preferred to vitrify the soot tube by heating it from outside while generating a melt front that migrates towards the inside.

Preferably, the synthetic glass to be produced by means of the production method according to the invention is a glass tube.

The glass obtainable through the production method according to the invention is characterized by its particularly high quality, and is essentially free of soot.

Therefore, a further subject matter of the present invention is a glass that can be or is obtained through the production method according to the invention.

A further subject matter of the invention is the use of the fluorination method according to the invention or of the fluorinated soot body according to the invention or of the production method according to the invention or of the glass according to the invention for producing optical elements, in particular optical fibers.

Specifically, the use as optical fiber involves the glass being elongated while forming a jacket or substrate tube and, preferably, being coated on the internal wall of the substrate tube.

The vitrified tube-shaped soot body can be used as a so-called jacket tube to envelope a core rod of a pre-mold. Moreover, due to its radial refractive index profile being homogeneous, the fluorinated soot body can just as well be used for producing a pre-mold for optical fibers by vitrifying the soot body and elongating it while forming a substrate tube and, if applicable, by depositing core material on the internal surface of the substrate tube by an MCVD method or by a PCVD method.

After vitrification and elongation, the substrate tube comprises a pre-determined homogeneous refractive index distribution across the tube wall. The substrate tube thus produced is therefore particularly well-suited for the production of pre-molds, in which defined refractive index profiles are of the essence.

A further advantageous usage option is to use the fluorinated soot body, preferably the fluorinated soot tube, in particular after a dehydrating step such as, for example, the chlorination step iii) in the production method according to the invention, and after vitrification as jacket material for producing a pre-mold for optical fibers by providing a so-called core rod and jacketing it with the glass tube. It is advantageous in this context for the hydroxyl group content to be low, which can be attained through the chlorination step (iii).

Example

In a laboratory experiment, $SiO_2$ soot bodies shaped like hollow circular cylinders (mass; 150 g; internal diameter: 10 mm; external diameter: 45 mm; length 160 mm; density 0.64 g/cm³) are first dried for 12 hours at a temperature of 900° C. at a nitrogen gas flow rate of 50 cm³/min.

Alternative 1: Fluorination with Hexafluoroethane

The fluorination of the soot body in a first alternative takes place using a gas mixture consisting of 5 volume-% (vol. %) $C_2F_6$, 5 vol. % hydrogen, and 90 vol. % nitrogen. The gas mixture is contacted to the porous soot body for a period of 3 hours at 900° C. at a gas flow rate of 50 cm³/min. The fluorination takes place at an internal reactor pressure of 5 mbar below the external reactor pressure, i.e., ambient atmospheric pressure.

Subsequently, the fluorination gas mixture is removed and chlorination is carried out for 3 hours using a gas mixture consisting of 20 vol. % chlorine and 80 vol. % nitrogen at a temperature of 900° C. and at a gas flow rate of 50 cm³/min.

The soot body was homogeneously fluorinated and showed no residues made of soot. A glass produced subsequently according to the invention from this soot body also showed no soot and very high quality in terms of the absence of optical defects.

Alternative 2: Fluorination with Tetrafluoromethane

The fluorination of the soot body in a second alternative takes place using a gas mixture consisting of 5 volume-% (vol. %) $CF_4$, 5 vol. % hydrogen, and 90 vol. % nitrogen. The gas mixture is contacted to the porous soot body for a period of 3 hours at 900° C. at a gas flow rate of 50 cm³/min. The fluorination takes place at an internal reactor pressure of 5 mbar below the external reactor pressure, i.e., ambient atmospheric pressure.

Subsequently, the fluorination gas mixture is removed and chlorination is carried out for 3 hours using a gas mixture consisting of 20 vol. % chlorine and 80 vol. % nitrogen at a temperature of 900° C. and at a gas flow rate of 50 cm³/min.

The soot body was homogeneously fluorinated and showed no residues made of soot. A glass produced subsequently according to the invention from this soot body also showed no soot and very high quality in terms of the absence of optical defects.

Further tests were carried out in order to determine the optimal temperature window for the fluorination according to the invention.

Thus, according to alternative 1, the soot body was first pre-dried and then treated with a gas mixture consisting of 5 volume-% (vol. %) $C_2F_6$, 5 vol. % hydrogen, and 90 vol. % nitrogen. The gas mixture was contacted to the porous soot body at a gas flow rate of 50 cm³/min and the temperature was varied continuously (see FIG. 1). The gases removed from the reactor were tested continuously as a function of the reaction temperature. Surprisingly, it was found that there is a small temperature window for fluorination with hexafluoroethane, in which the fluorination is highly efficient, and in which strong fluorination commences without any soot formation being observed.

Figure 2:
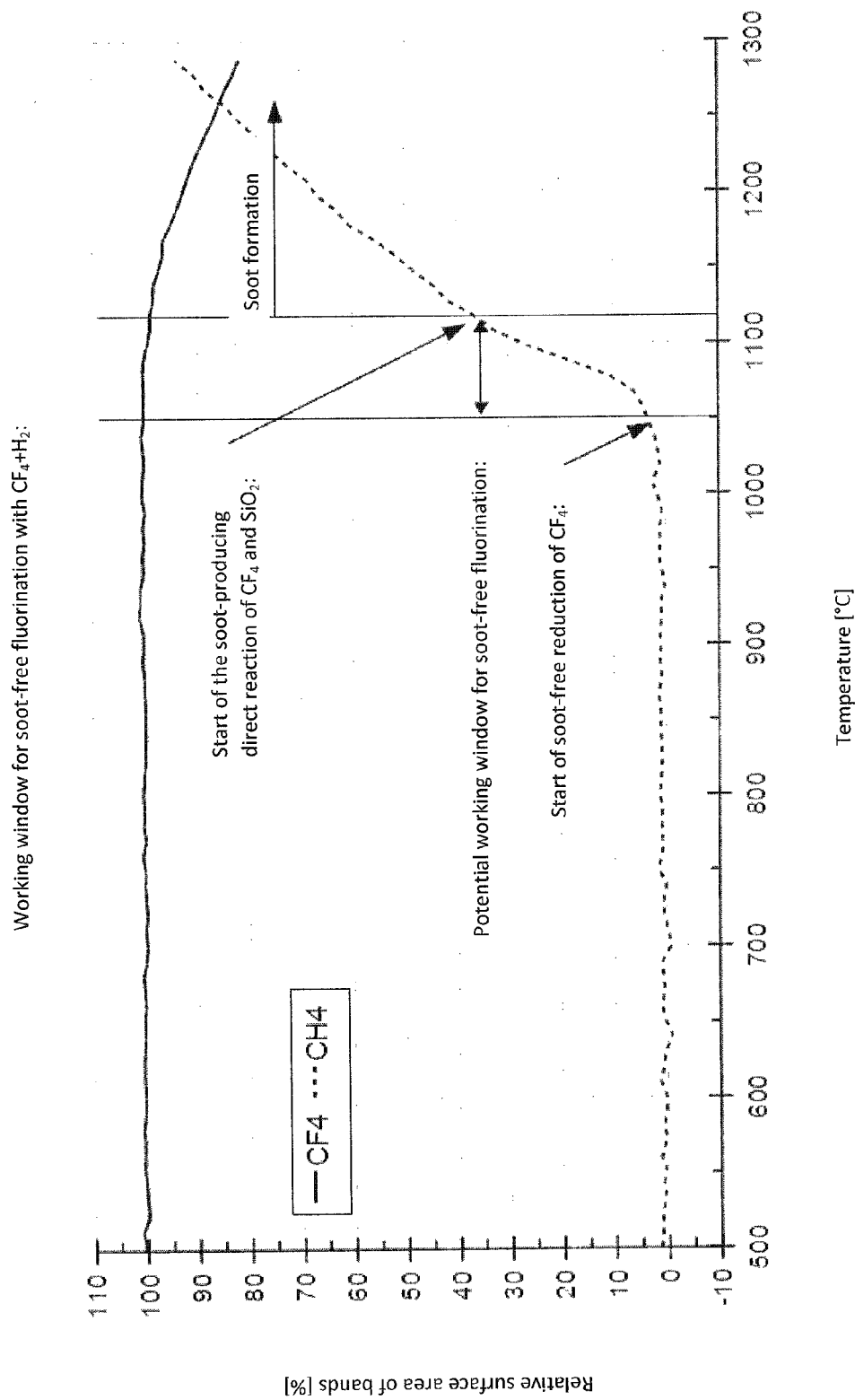
FIG. 2 is a graph of relative surface area of bands versus temperature for soot-free fluorination with $CF_4$ and $H_2$.

According to alternative 2, the soot body was first pre-dried and then treated with a gas mixture consisting of 5 volume-% (vol. %) $CF_4$, 5 vol. % hydrogen, and 90 vol. % nitrogen. The gas mixture was contacted to the porous soot body at a gas flow rate of 50 cm³/min and the temperature was changed continuously (see FIG. 2). The gases removed from the reactor were tested continuously as a function of the reaction temperature. Surprisingly, it was found that there is a small temperature window for fluorination with tetrafluoromethane, in which the fluorination is highly efficient and in which strong fluorination commences without any soot formation being observed.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for fluorinating a soot body, comprising the steps of
    a) providing a soot body, and
    b) treating the soot body with a gas mixture comprising hydrogen and $C_nF_{2n+2}$, wherein n=1 or 2, at a fluorination temperature in a range of $(1,280-n*250)°$ C. to $(1,220-n*100)°$ C., wherein the gas mixture contains 35 to 95 vol. % nitrogen based on a total volume of the gas mixture at 25° C.

2. The method according to claim 1, comprising treating the soot body with a gas mixture comprising $CF_4$ and hydrogen at a temperature range of 1,050 to 1,120° C.

3. The method according to claim 1, comprising treating the soot body with a gas mixture comprising $C_2F_6$ and hydrogen at a temperature range of 750 to 1,000° C.

4. The method according to claim 1, wherein the gas mixture contains up to 65 vol. % $C_nF_{2n+2}$ and hydrogen, each based on a total volume of the gas mixture at 25° C.

5. The method according to claim 1, wherein the gas mixture contains 10 to 60 vol. % $C_2F_6$ or $CF_4$, each based on a total volume of the gas mixture at 25° C.

6. The method according to claim 1, wherein the soot body is a porous $SiO_2$ soot body having a mean density of 0.48 g/cm³ to 0.77 g/cm³ and a specific surface area of more than 5 m²/g.

7. A fluorinated soot body obtained by the method according to claim 1.

8. A method for producing a synthetic glass for an optical element comprising the steps of:
    i) producing or providing a soot body;
    ii) fluorinating the soot body according to claim 1;
    iii) optionally chlorinating the fluorinated soot body; and
    iv) vitrifying the fluorinated soot body at a pressure of less than 0.1 bar at a temperature above the fluorination temperature.

9. The method according to claim 8, wherein the soot body is produced by depositing $SiO_2$ particles for mass deposition on a substrate that rotates about its longitudinal axis using at least one depositing burner.

10. The method according to claim 8, wherein the synthetic glass is a glass tube.

11. A glass obtained by the method according to claim 8.

12. An optical element produced by the method according to claim 8.

13. A method of producing an optical fiber from the glass according to claim 11, comprising elongating the glass while forming a substrate tube and coating the glass on an internal wall of the substrate tube.

14. A method for fluorinating a soot body, comprising the steps of
    a) providing a soot body, and
    b) treating the soot body with a gas mixture comprising hydrogen and $C_nF_{2n+2}$, wherein n=1 or 2, at a fluorination temperature in a range of $(1,280-n*250)°$ C. to $(1,220-n*100)°$ C., wherein the gas mixture contains hydrogen in an amount of up to 15 vol. % based on a total volume of the gas mixture at 25° C.

15. The method according to claim 14, comprising treating the soot body with a gas mixture comprising $CF_4$ and hydrogen at a temperature range of 1,050 to 1,120° C.

16. The method according to claim 14, comprising treating the soot body with a gas mixture comprising $C_2F_6$ and hydrogen at a temperature range of 750 to 1,000° C.

17. The method according to claim 14, wherein the gas mixture contains up to 65 vol. % $C_nF_{2n+2}$ and hydrogen, each based on a total volume of the gas mixture at 25° C.

18. The method according to claim 14, wherein the gas mixture contains 10 to 60 vol. % $C_2F_6$ or $CF_4$, each based on a total volume of the gas mixture at 25° C.

19. The method according to claim 14, wherein the soot body is a porous $SiO_2$ soot body having a mean density of 0.48 g/cm³ to 0.77 g/cm³ and a specific surface area of more than 5 m²/g.

20. A fluorinated soot body obtained by the method according to claim 14.

21. A method for producing a synthetic glass for an optical element comprising the steps of:
    i) producing or providing a soot body;
    ii) fluorinating the soot body according to claim 14;
    iii) optionally chlorinating the fluorinated soot body; and
    iv) vitrifying the fluorinated soot body at a pressure of less than 0.1 bar at a temperature above the fluorination temperature.

22. The method according to claim 21, wherein the soot body is produced by depositing $SiO_2$ particles for mass deposition on a substrate that rotates about its longitudinal axis using at least one depositing burner.

23. The method according to claim 21, wherein the synthetic glass is a glass tube.

24. A glass obtained by the method according to claim 21.

25. An optical element produced by the method according to claim 21.

26. A method of producing an optical fiber from the glass according to claim 24, comprising elongating the glass while forming a substrate tube and coating the glass on an internal wall of the substrate tube.

* * * * *